United States Patent
Wisecarver

(10) Patent No.: US 8,096,265 B1
(45) Date of Patent: Jan. 17, 2012

(54) WILDLIFE FEEDER

(76) Inventor: Todd Wisecarver, Hamburg, AR (US)

( * ) Notice: Subject to any disclaimer, the term of this patent is extended or adjusted under 35 U.S.C. 154(b) by 156 days.

(21) Appl. No.: 12/436,251

(22) Filed: May 6, 2009

Related U.S. Application Data

(60) Provisional application No. 61/050,831, filed on May 6, 2008.

(51) Int. Cl.
*A01K 5/00* (2006.01)
*A01K 5/02* (2006.01)

(52) U.S. Cl. .................. 119/57.1; 119/56.1; 119/56.2; 119/57.7

(58) Field of Classification Search ............... 119/51.01, 119/52.1, 56.1, 56.2, 57, 57.1, 57.2, 57.7
See application file for complete search history.

(56) References Cited

U.S. PATENT DOCUMENTS

| | | | | |
|---|---|---|---|---|
| 3,357,540 A | * | 12/1967 | Lippi | 198/582 |
| 3,598,087 A | * | 8/1971 | Ramser | 119/51.11 |
| 4,003,339 A | * | 1/1977 | Hostetler | 119/57.4 |
| 4,722,300 A | * | 2/1988 | Walker et al. | 119/51.11 |
| 5,138,979 A | | 8/1992 | Baird et al. | |
| 5,243,930 A | | 9/1993 | Rahm | |
| 5,275,129 A | * | 1/1994 | Vigesaa et al. | 119/51.11 |
| 5,474,027 A | * | 12/1995 | Pollock | 119/57.4 |
| 5,697,327 A | * | 12/1997 | Pollock | 119/57.4 |
| 6,082,300 A | * | 7/2000 | Futch | 119/51.11 |
| 6,263,833 B1 | * | 7/2001 | Runyan et al. | 119/51.11 |
| 6,481,376 B1 | | 11/2002 | Finklea | |
| 6,499,927 B2 | * | 12/2002 | Mitchell et al. | 414/139.9 |
| 6,571,734 B1 | | 6/2003 | Finklea | |
| 6,578,517 B2 | | 6/2003 | Borries | |
| 6,779,487 B1 | | 8/2004 | Kochan | |
| 6,814,029 B1 | | 11/2004 | Chesser | |
| 6,889,630 B1 | | 5/2005 | Wayman | |
| 6,920,842 B1 | * | 7/2005 | Davis | 119/53 |
| 7,028,635 B1 | * | 4/2006 | Eastman, II | 119/51.11 |
| 7,314,406 B2 | * | 1/2008 | Bilinovich | 452/185 |
| 2002/0108579 A1 | | 8/2002 | Borries | |
| 2003/0019437 A1 | * | 1/2003 | Fore | 119/57.92 |
| 2003/0070622 A1 | * | 4/2003 | Vaags | 119/51.11 |
| 2005/0217591 A1 | * | 10/2005 | Turner et al. | 119/51.02 |
| 2006/0060148 A1 | | 3/2006 | Boyer | |

* cited by examiner

*Primary Examiner* — David Parsley
(74) *Attorney, Agent, or Firm* — J. Charles Dougherty

(57) ABSTRACT

A motorized wildlife feeder provides a reliable flow of powdery feeds, such as rice bran, from a hopper to the ground. The hopper is partially formed by a funnel with a unique, eight-sided shape. The unique shape of the funnel is believed to provide reliable flow of powdery feeds, whereas typical funnels with round sides tend to plug when such feeds are used. Vibrators attached to the hopper assist the flow of feed from the hopper into a trough, where an auger moves the feed to a downspout and onto the ground.

18 Claims, 5 Drawing Sheets

WILDLIFE FEEDER

CROSS-REFERENCE TO RELATED APPLICATIONS

This application claims the benefit of U.S. Provisional Application No. 61/050,831, entitled "Wildlife Feeder" and filed on May 6, 2008. The complete disclosure of such provisional patent application is hereby incorporated by reference.

STATEMENT REGARDING FEDERALLY SPONSORED RESEARCH OR DEVELOPMENT

Not applicable.

BACKGROUND OF THE INVENTION

1. Field of the Invention

The present invention relates to wildlife feeders, and in particular to feeders capable of dispensing powdery feeds such as rice bran.

2. Brief Description of the Related Art

The use of feed for the hunting of large game animals, such as deer, elk, and the like, is well known. By feeding game animals at a stationary location over a period of time, the game animals become accustomed to the presence of food, and will return to the area regularly for feeding. The hunter can then choose a hunting position near the feeding area, thereby increasing the likelihood of a desirable game animal approaching within the effective range of the hunter's weapon.

The simplest method of feeding game animals is to periodically dispense the feed onto the ground by hand. Game animals, however, have a strong sense of smell and are highly adverse to human scent, and thus it is undesirable to return to the feeding area for food replenishment on a frequent basis. Also, food dispensed upon the ground may be eaten by birds and smaller animals before the game animals arrive, thereby defeating the purpose of dispensing the feed. For these reasons, a number of feeders with various types of hopper arrangements have been developed. Such devices may be set up and left unattended for a significant period of time before replenishment is necessary. Some feeders operate with a gravity-feed mechanism; for example, U.S. Pat. No. 6,578,517 to Borries teaches a game animal feeder with an internal baffle to mitigate flow through the gravity feed mechanism. Likewise, U.S. Pat. No. 6,571,734 to Finklea teaches a gravity-feed wild game feeder with a series of channels that lead to feed ports at the base of the device. Other wild game feeders are motorized, and may be controlled by a timer in order to dispense a controlled amount of feed on a periodic basis. Such devices are often arranged to hang from a tree or an attached stand in order to distribute feed onto the ground below. U.S. Pat. No. 6,814,029 to Chesser teaches a motorized deer feeder mechanism in this category.

Wild game feeders, whether using gravity-feed or a motorized-feed dispersal system, are generally optimized to dispense a pelletized or granular feed. Commercially produced deer feed, for example, is commonly available in a pelletized form, which is ideal for dispersal through the types of wild game feeders discussed above. Corn is also commonly used as a wild game animal feed, and, like feed pellets, is highly granular in form. The inventor has found, however, that these wild game feeders will not reliably feed powdery feed materials, such as rice bran. It has been recognized that rice bran is a superior game animal feed in a number of respects. Rice bran is considered more nutritious than corn, providing a typical yield of 12% protein, 12% fat, and 12% fiber. The powdery nature of rice bran, however, will cause the usual type of commercial game feeders to clog, failing to dispense the material and thus defeating the desired purpose of attracting game animals. It would therefore be desirable to develop a wildlife feeder that was capable of dispensing powdery feeds such as rice bran. These limitations of the prior art are overcome by the present invention as described below.

BRIEF SUMMARY OF THE INVENTION

The present invention is directed to a wildlife feeder that is capable of distributing powdery feeds such as rice bran. The invention is directed to a uniquely shaped hopper in conjunction with a vibrator that effectively moves powdery feeds out of the hopper in controlled portions.

In one aspect of the present invention, the invention is directed to a feeder for the delivery of powdery feeds, comprising a hopper with a funnel portion comprising a plurality of distinct sides and a funnel spout, and a vibrator in communication with the hopper whereby activation of the vibrator serves to vibrate the funnel portion. In another aspect of the present invention, the invention is directed to a feeder comprising a hopper with a funnel portion comprising a plurality of creased edges, and a vibrator in communication with the hopper whereby activation of the vibrator serves to vibrate the funnel portion.

It is therefore an object of the present invention to provide for a wildlife feeder that will not clog when used with powdery feeds such as rice bran. This and other features, objects and advantages of the present invention will become better understood from a consideration of the following detailed description of the preferred embodiment and appended claims in conjunction with the drawings as described following:

DETAILED DESCRIPTION OF THE PREFERRED EMBODIMENT

Figure 1:
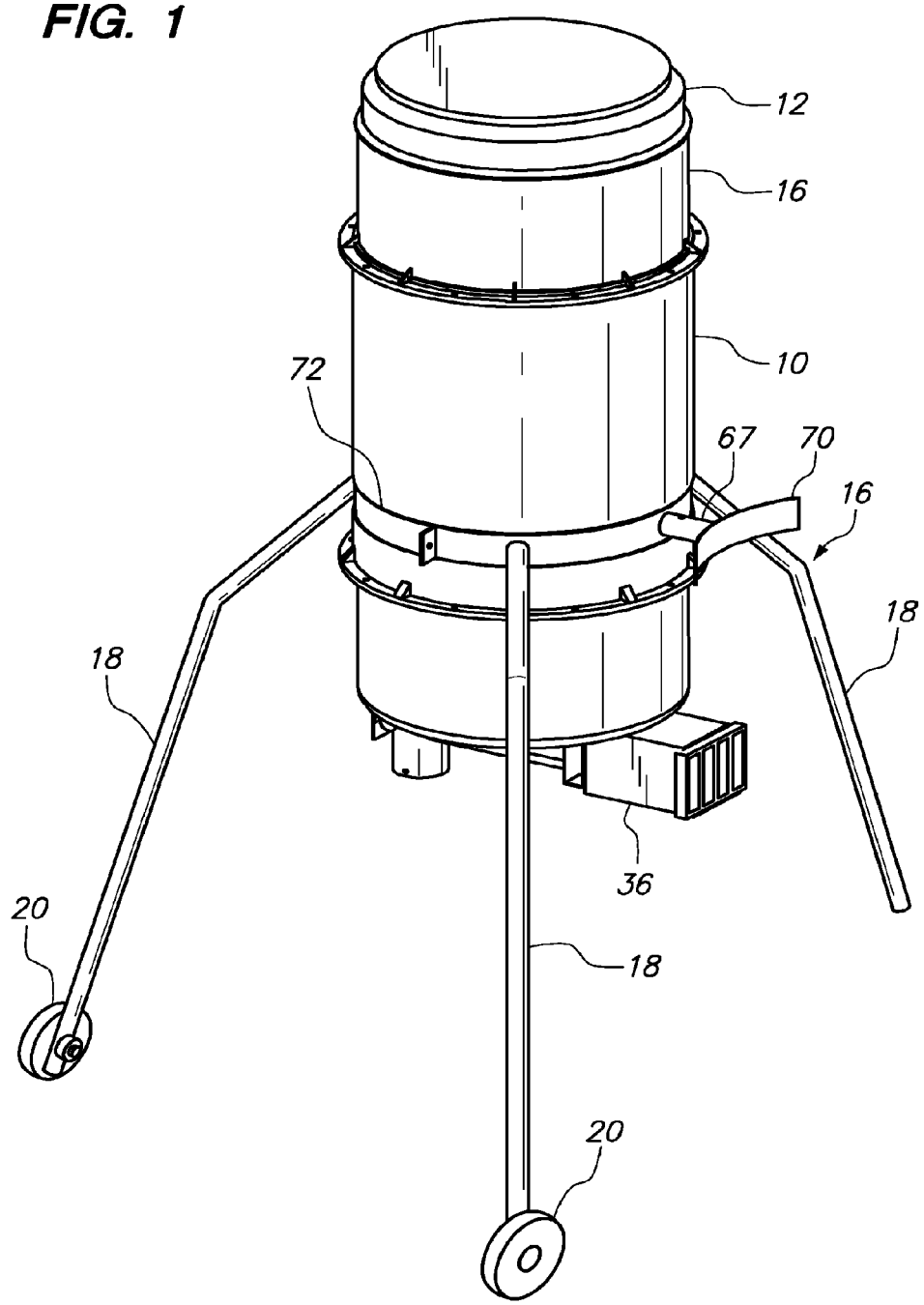
FIG. 1 is a perspective view of a preferred embodiment of the present invention in a free-standing configuration.

With reference to FIG. 1, the exterior structure of a preferred embodiment of the present invention in a free-standing configuration may now be described. Barrel 10 forms the main body of the feeder. Preferably, barrel 10 is formed of various types of rigid plastic as well known in the art. Plastic is desirable because of its light weight. Alternatively, steel or aluminum could be used in the construction of barrel 10. Barrel 10 is preferably formed in three distinct sections which may be fitted together, but may alternatively be constructed of a single section or any number of multiple sections. Lid 12, also preferably formed of plastic, may be used to close the top of barrel 10 once the feeder is loaded with feed. Lid 12 preferably includes internal threads (not shown) that mate with a threaded region of barrel 10. Other types of sealing mechanisms between lid 12 and barrel 10 may be used, as are known in the art. A compressible gasket (not shown) may be disposed within lid 12 to engage the top lip of barrel 10 and thereby provide a moisture-proof barrier to protect feed within barrel 10 when lid 12 is attached.

The preferred embodiment of the invention comprises both a free-standing configuration and a configuration intended for attachment to a tree, pole, or other existing vertical support. In the free-standing configuration shown in FIG. 1, support structure 16 preferably includes three legs 18 to provide support for the feeder. In alternative embodiments, a different form of support structure might be employed, or support structure 16 may be omitted. While three legs 18 are shown, four or more legs 18 could be employed in alternative embodiments. The preferred material for the construction of support structure 16 is 1¼", 18 gauge steel tubing, which is relatively light weight but provides sufficient strength to support the feeder when filled with feed.

Wheel assemblies 20 may preferably be attached to two of the three legs 18 in order to provide for easy transportation of the feeder to and from the feeding site without the necessity of lifting the feeder entirely off the ground. The hunter may simply grasp the leg 18 that does not have an attached wheel assembly 20 and raise it from the ground, then pull the feeder along on wheel assemblies 20 extending from the other two legs, in a manner similar to a cart. Since one leg 18 does not include a wheel assembly 20, the feeder will not roll under its own weight if placed on a flat surface or modest incline. Legs 18 are preferably removably fitted to barrel 10 by sliding their open upper ends over leg guide rods 71 (visible in FIG. 5B) extending from barrel belly band 72. Legs 18 may be held removably in place on leg guide rods 71 by pins (not shown) or the like, as well known in the art, or may be held in place by a friction fit.

Figure 2A:
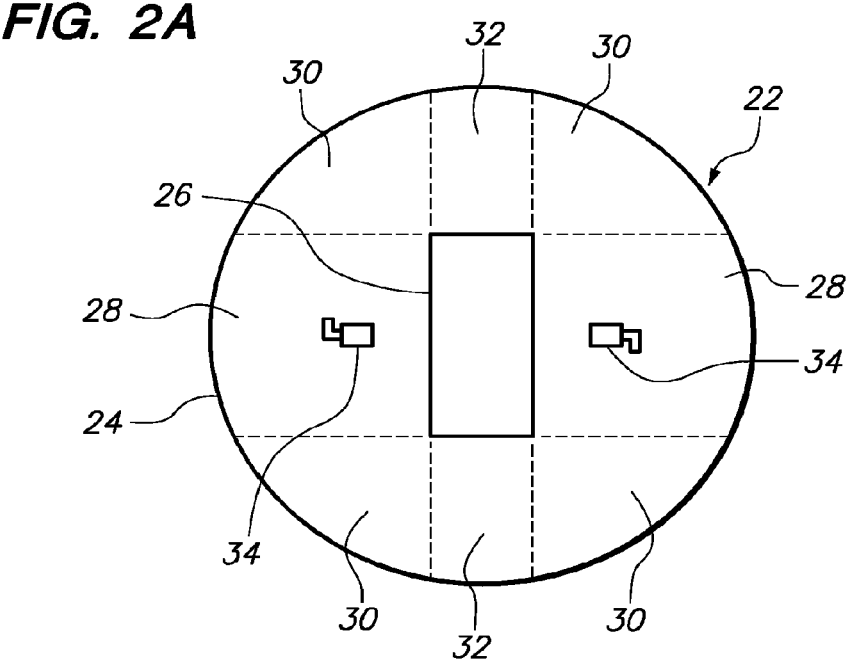
FIG. 2A is a top plan detail view of a funnel according to a preferred embodiment of the present invention.
Figure 2B:
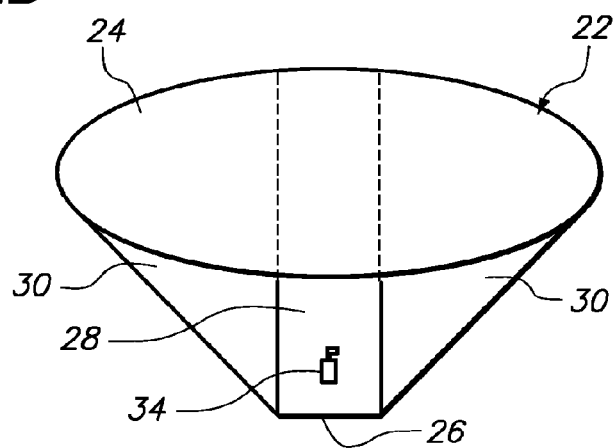
FIG. 2B is a side elevational detail view of a funnel according to a preferred embodiment of the present invention.

Turning now to FIGS. 2A and 2B, the structure of a metal funnel 22 of a preferred embodiment of the present invention may be described. A hopper is formed within barrel 10 by fitting funnel 22 within barrel 10. The top lip 24 of funnel 22 is round, and is sized to fit snugly against the interior walls of barrel 10. As a result, the portion of the interior sides of barrel 10 that extend above top lip 24 form a hopper in conjunction with the interior of funnel 22 itself. Funnel 22 is preferably sized to fill about the bottom one-third of barrel 10.

Funnel 22 is of a unique shape that the inventor has found provides reliable flow with powdery feeds such as rice bran. The interior surface of funnel 22 is not perfectly round, but forms eight distinct "sides" as it tapers toward rectangular spout 26 at its bottom. These include two side portions 28; four triangular side portions 30; and two rectangular end portions 32. It will be seen that this shape results in distinct "creases" in the wall of funnel 22, which are believed by the inventor to improve the flow of powdery feed materials. The inventor has found that a typical round funnel shape, without these distinct creases or sides, will not provide reliable flow of powdery feeds such as rice bran. In the preferred embodiment, two vibrators 34 are placed on funnel 22, one on the lower, outside portion of each of the two rectangular side portions 28. The vibration frequency of vibrators 34 is preferably about 8400 rpms, although other vibration frequencies could be employed in alternative embodiments. Vibrators capable of producing sufficient vibration of this frequency and sufficient amplitude to move powdery feed through funnel 22 are well known in the art. In alternative embodiments, a different placement of vibrators 34 could be employed, or a different number of vibrators 34 could be employed.

Figure 2E:
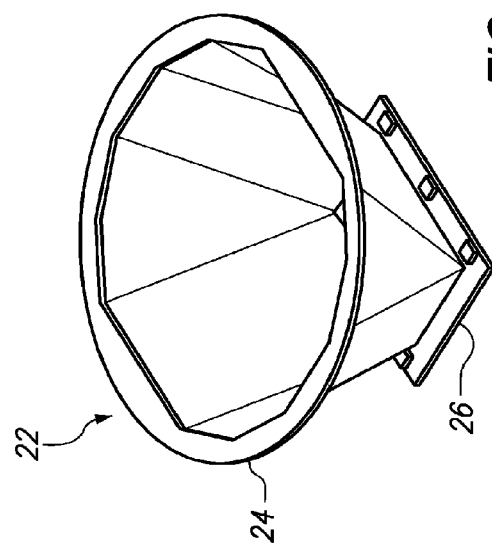
FIG. 2E is a perspective view of a funnel according to a second preferred embodiment of the present invention.
Figure 2C:
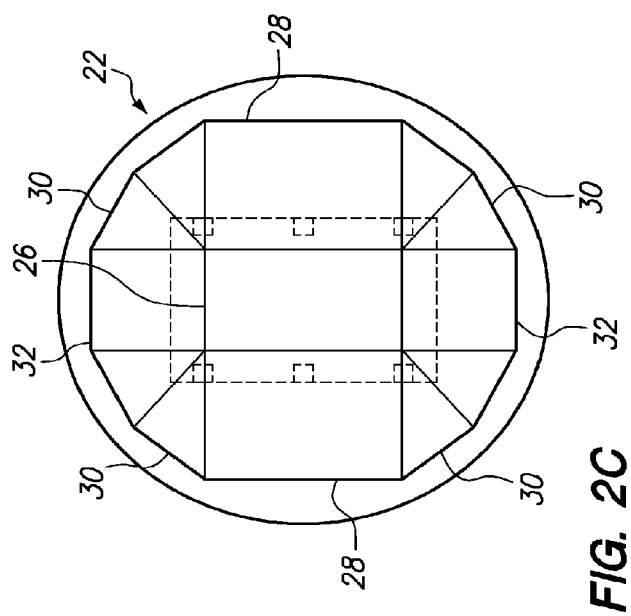
FIG. 2C is a top plan detail view of a funnel according to a second preferred embodiment of the present invention.
Figure 2D:
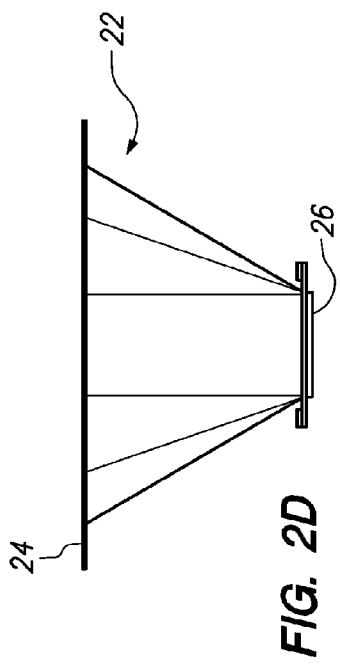
FIG. 2D is a side elevational detail view of a funnel according to a second preferred embodiment of the present invention.

Another preferred embodiment of funnel 22, in this instance shaped so that it may be more easily molded from plastic, is shown in FIGS. 2C, 2D, and 2E. In this embodiment, lip 24 is round at its outside, but forms a twelve-sided shape at its inside edge. Side portions 30 are subdivided into two sub-sections each, resulting in twelve creases in the interior of funnel 22. The number of creases provided in funnel 22 may vary in alternative embodiments of the invention.

Figure 3:
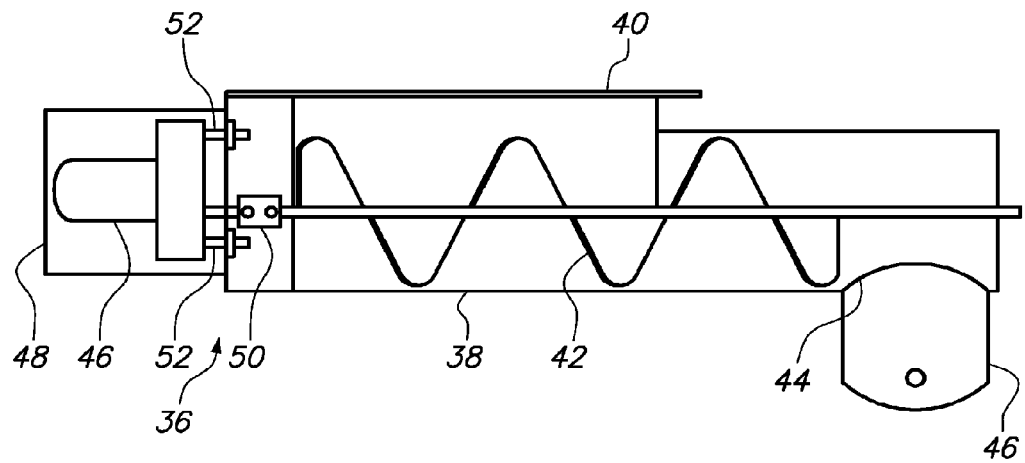
FIG. 3 is an elevational, partial cut-away detail view of a trough feed delivery mechanism of a preferred embodiment of the present invention.

Referring now to FIG. 3, feed mechanism 36 of the preferred embodiment of the present invention may now be described. Trough 38 is fitted beneath funnel 22 at spout 26, on the bottom side of barrel 10. Trough 38 has upper opening 40 sized to match the opening of spout 26, and thereby receive feed that flows from funnel 22 downwardly through spout 26. In the preferred embodiment this opening is about six inches in length, but other sizes could be used in alternative embodiments. Auger 42 fits snugly within trough 38, such that rotation of auger 40 delivers feed flowing from spout 26 through upper opening 40 towards outlet port 44. It may be noted that in the preferred embodiment there is a roughly two-inch long area of trough 38 that extends beyond the bladed portion of auger 42. The purpose of this arrangement is to prevent inadvertently free flow of feed through the system when auger 40 is not turning. Alternative embodiments may use a different length for this area or omit this area of trough 38.

Auger 40 is driver by gear motor 46. Gear motor 46 is preferably a 12 rpm, 600:1 ratio gear motor driven by a 12 V DC power supply, such as produced under the Dayton brand name by the Emerson Motor Co. of St. Louis, Mo. Motor cover 48, preferably formed of plastic or light sheet metal, is preferably fitted over gear motor 46 to protect it from the elements. Collar 50, which may be of many types as well known in the art, is preferably used to couple gear motor 46 to auger 42. Gear motor 46 may be mounted to trough 38 using screws 52 or the like.

Downspout 46 is attached at outlet port 44 of trough 38. In the preferred embodiment, downspout 46 is roughly three inches in diameter to provide sufficient flow of feed, but other sizes could be employed in alternative embodiments. A hose (not shown) of various lengths may be attached to downspout 46 in various alternative embodiments in order to provide more control for the dispersal of feed to the ground beneath the feeder.

Figure 4:
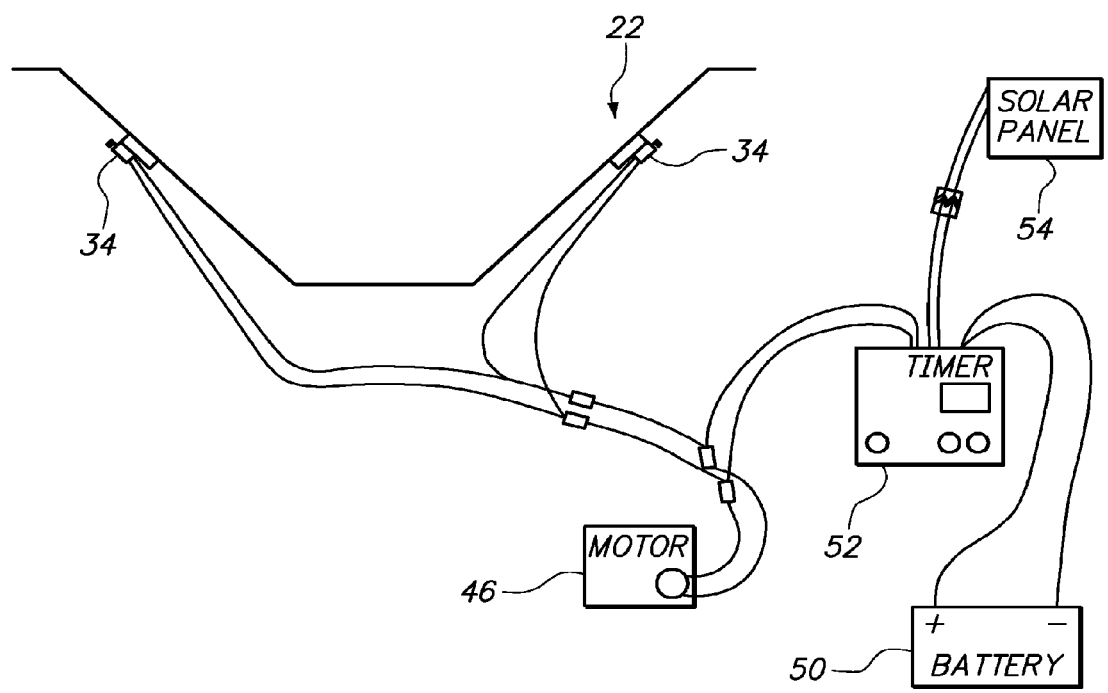
FIG. 4 is a simplified electrical diagram for a preferred embodiment of the present invention.

Referring now to FIG. 4, the interconnection of the electrical components of a preferred embodiment of the present invention may be described. Battery 50 provides power to the system. Battery 50 is preferably of a type, such as a 1280 universal battery, that provides 12V DC current. Battery 50 may be physically located at any desirable location on the feeder, such as within barrel 10 and beneath funnel 22. In another preferred embodiment, battery 50 may be located in a protective box (not shown) positioned beneath barrel 10, which provides greater ease of access to battery 50 for replacement and maintenance. Preferably, a solar panel 54 is provided to enable a trickle re-charging function for battery 50, such solar panels being well known in the art. Solar panel 54 may, in a preferred embodiment, be mounted to the outside of barrel 10. Alternatively, solar panel 54 may be placed elsewhere on the feeder, mounted externally to the feeder, or omitted. Battery 50 and/or solar panel 54 drives timer 52, which acts as a switch controlling the on/off function of the feeder. Preferably, timer 52 is of a type that allows for programming of multiple feeding times per day with variable lengths of time for which feed is dispensed at each feeding time, such timers being well known in the art. Timer 52 may preferably be mounted within barrel 10 and beneath funnel 22, or alternatively in any other accessible location. Power to vibrators 34 and gear motor 46 is provided when timer 52 is switched to the "on" position according to its programming as set by the user.

The operation of the feeder may now be described, again with reference to FIGS. 1-4. Battery 50 is charged and the feeder is positioned in an area where it is desired to attract game animals. Timer 52 is set with the desired frequency of feeding times and feeding time length. The hopper formed by the inside of barrel 10 and funnel 22 is filled with feed, such as rice bran, and the hunter leaves the area. Once timer 52 switches to the "on" position according to its programming, vibrators 34 will activate, thereby loosening feed within funnel 22 and allowing it to flow downwardly through spout 26 and into trough 38. Timer 52 also activates gear motor 46, which drives auger 42. The rotation of auger 42 moves feed from that portion of trough 38 directly beneath spout 26 and toward the opposite end of trough 38. Feed moved in this way will reach downspout 46, where it drops by gravity through hose 48 to the ground. Once timer 52 moves back to the "off" position according to its programming, power to the system is stopped and the flow of feed onto the ground will cease.

Figure 5A:
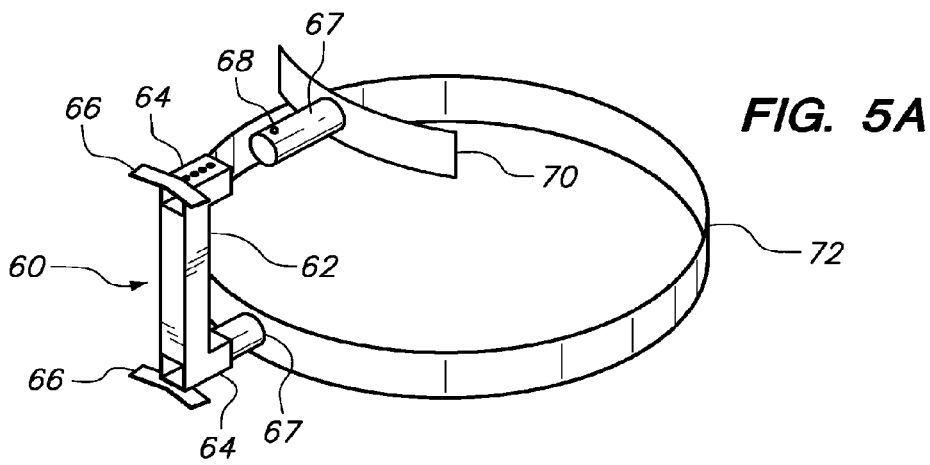
FIG. 5A is a side elevational view of a bracket for mounting a preferred embodiment of the present invention to a tree.
Figure 5B:
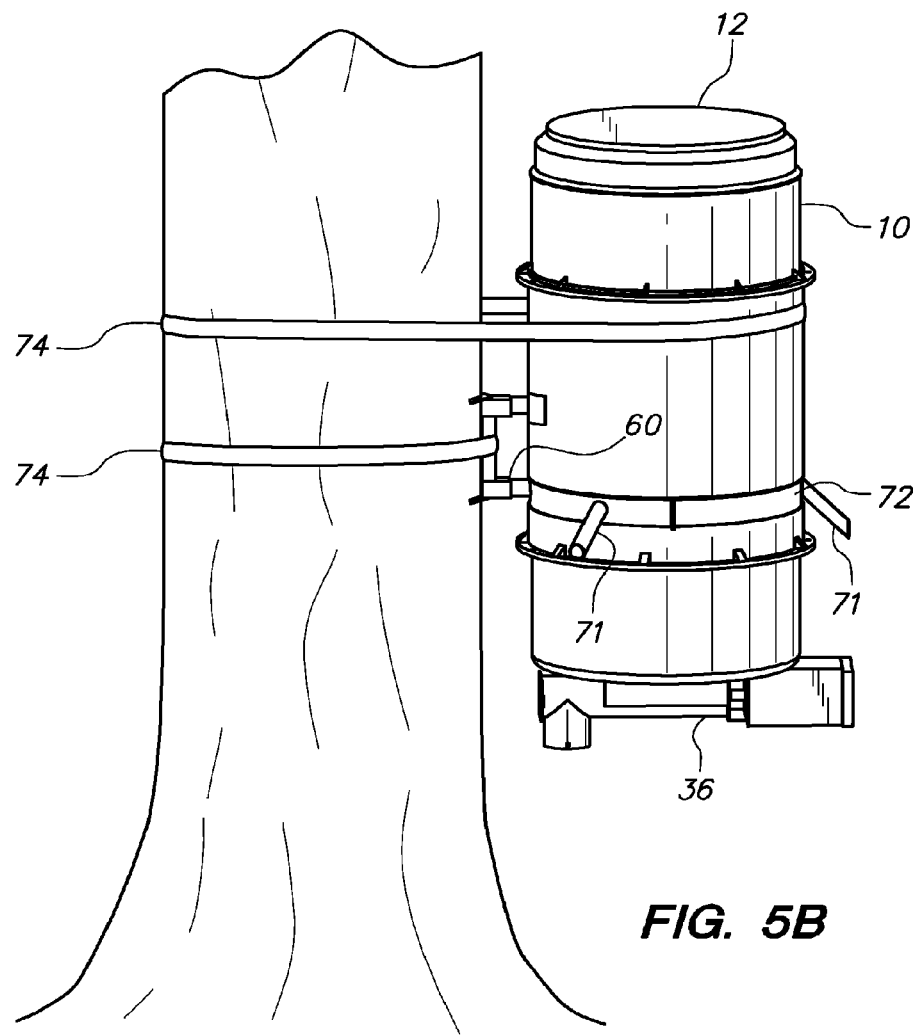
FIG. 5B is a perspective view of a preferred embodiment of the present invention as mounted to a tree.

As noted above, the present invention comprises both free-standing configurations, such as using the stand shown in FIG. 1, as well as configurations intended for mounting on a tree or post, such as shown in FIGS. 5A and 5B. In one preferred embodiment, mounting in this configuration is facilitated by bracket 60, shown in detail in FIG. 5A. Vertical support 62 has transverse supports 64 mounted at either end. In the preferred embodiment, vertical support 62 and transverse supports 64 are formed of 1½" square steel tubing, although other sufficiently strong materials could be used in alternative embodiments. Vertical support 62 and transverse supports 64 are preferably connected together by welding, but could be connected by other means as known in the art. Wings 66 are welded or otherwise connected on the outside edges of transverse supports 64. Preferably, wings 66 are formed of two pieces of 1"×⅛" flat bar set at a slight angle, forming a shallow "V" shape opening in the direction opposite the direction in which transverse supports 64 extend. Adjustment bars 67 are sized to be fitted within the hollow interior of transverse supports 64, and by means of a series of matched openings, may be adjustably held in place extending from traverse supports 64 at different lengths by means of pins 68. In the preferred embodiment, adjustment bars 67 may be formed of 1¼" round steel tubing, and pins 68 may be ¼" nipple clips. The upper adjustment bar 67 may optionally include plate 70 formed of flat bar and welded or otherwise attached perpendicular to the axis of upper adjustment bar 67. Plate 70 serves to prevent damage to the wall of barrel 10 when the feeder is mounted to a vertical support. Lower adjustment bar has attached barrel belly band 72, which preferably is formed of 10 gauge steel, 2" width banding material. Barrel belly band 72 is sized to snugly and securely receive barrel 10. In another preferred embodiment, one adjustment bar 67 and plate 70 may be permanently fitted to barrel belly band 72, as shown in FIG. 1. In this embodiment, it may be seen that plate 70 is intended to rest against the tree or other vertical support instead of barrel 10.

Attachment of the preferred embodiment of the present invention with bracket 60 to a tree, pole, or other existing vertical support using bracket 60 is shown in FIG. 5B. Adjustment bars 66 are fitted to transverse supports 64 by means of pins 68 at the desired extension, which allows the hunter to determine how far barrel 10 will be extending from the vertical support to which it is attached. Bracket 60 is then fitted to barrel 10 at band 72. In order to attach barrel 10 to the tree, pole, or other vertical support, bracket 60 is fitted against the vertical support such that wings 66 are pressed against the vertical support. Preferably, wings 66 have sufficiently sharp edges to provide a "bite" in the wood or other soft material forming the vertical support, thereby helping to avoid slippage of barrel 10. Ratcheting straps 74, which may be formed of nylon or other material and as are well known in the art, are then wrapped around bracket 60 and the vertical support at a lower position, and around barrel 10 and the vertical support at an upper position, to hold barrel 10 in place. To remove barrel 10 from the vertical support, ratcheting straps 74 may simply be loosened and the assembly formed by barrel 10 and bracket 60 removed. It may be seen in the alternative vertical support mounting arrangement as shown in FIG. 1, with an adjustment bar 67 and band 70 mounted to barrel belly band 72 on barrel 10, ratcheting straps 74 may be similar used to secure barrel 10 to the vertical support.

The present invention has been described with reference to certain preferred and alternative embodiments that are intended to be exemplary only and not limiting to the full scope of the present invention as set forth in the appended claims.

What is claimed is:

1. A feeder for the delivery of powdery feeds, comprising:
  (a) a hopper, said hopper comprising a funnel portion comprising a plurality of distinct sides separated by creases, the plurality of distinct sides comprising a pair of diametrically opposed, rectangular side portions; a pair of diametrically opposed, rectangular end portions each lying perpendicular to each of the side portions, and four triangular corner portions, each of the corner portions connecting one of the side portions and one of the end portions, and being positioned diagonally opposed to another of the corner portions; and a rectangular funnel spout; and
  (b) at least one vibrator in communication with said hopper whereby activation of said vibrator serves to vibrate said funnel portion wherein the feeder is operable to deliver a powdery feed from said hopper through said funnel spout.

2. The wildlife feeder of claim 1, wherein said powdery feed comprises rice bran.

3. The wildlife feeder of claim 1, further comprising a trough positioned beneath said funnel spout and an auger positioned within said trough.

4. The wildlife feeder of claim 3, wherein said trough further comprises a downspout, and wherein said auger comprises a blade comprising a first and second blade end, and wherein said first blade end is positioned nearer to said funnel spout and said second blade end is positioned nearer said downspout.

5. The wildlife feeder of claim 3, further comprising a gear motor driving said auger.

6. The wildlife feeder of claim 5, further comprising:
  (a) a timer operable to control said gear motor and said vibrator; and (b) a battery to power said timer, said gear motor, and said auger.

7. The wildlife feeder of claim 6, further comprising a solar panel connected to said battery and operable to re-charge said battery.

8. The wildlife feeder of claim 1, further comprising a barrel housing said hopper, and a stand attached to said barrel, wherein said stand comprises at least three legs, and at least two of said three legs comprises a wheel assembly.

9. The wildlife feeder of claim 1, further comprising a barrel housing said hopper, a bracket adaptable to be fitted to a vertical support, and a band extending circumferentially around said barrel attaching said barrel to said bracket.

10. A feeder, comprising:
(a) a hopper, said hopper comprising a funnel portion comprising a plurality of creased edges separating a plurality of distinct sides, the sides comprising a pair of diametrically opposed, rectangular side portions; a pair of diametrically opposed, rectangular end portions each lying perpendicular to each of the side portions, and four triangular corner portions, each of the corner portions connecting one of the side portions and one of the end portions, and being positioned diagonally opposed to another of the corner portions, and a funnel spout comprising an opening formed by the connection of the plurality of distinct sides at a lower end of the funnel portion; and
(b) at least one vibrator in communication with said hopper whereby activation of said vibrator serves to vibrate said funnel portion wherein the feeder is operable to deliver a powdery feed from said hopper through said funnel spout.

11. The wildlife feeder of claim 10, wherein said powdery feed comprises rice bran.

12. The wildlife feeder of claim 10, further comprising a trough positioned beneath said funnel spout and an auger positioned within said trough.

13. The wildlife feeder of claim 12, wherein said trough further comprises a downspout, and wherein said auger comprises a blade comprising a first and second blade end, and wherein said first blade end is positioned nearer to said funnel spout and said second blade end is positioned nearer said downspout.

14. The wildlife feeder of claim 12, further comprising a gear motor driving said auger.

15. The wildlife feeder of claim 14, further comprising:
(a) a timer operable to control said gear motor and said vibrator; and
(b) a battery to power said timer, said gear motor, and said auger.

16. The wildlife feeder of claim 15, further comprising a solar panel connected to said battery and operable to re-charge said battery.

17. The wildlife feeder of claim 10, further comprising a barrel housing said hopper, and a stand attached to said barrel, wherein said stand comprises at least three legs, and at least two of said three legs comprises a wheel assembly.

18. The wildlife feeder of claim 10, further comprising a barrel housing said hopper, a bracket adaptable to be fitted to a vertical support, and a band extending circumferentially around said barrel attaching said barrel to said bracket.

* * * * *